(12) United States Patent
Todoriki et al.

(10) Patent No.: US 9,573,813 B2
(45) Date of Patent: Feb. 21, 2017

(54) GRAPHITE OXIDE, GRAPHENE OXIDE OR GRAPHENE, ELECTRIC DEVICE USING THE SAME AND METHOD OF MANUFACTURING THE SAME, AND ELECTRODIALYSIS APPARATUS

(75) Inventors: Hiroatsu Todoriki, Kanagawa (JP); Yasuhiko Takemura, Kanagawa (JP); Kuniharu Nomoto, Saitama (JP)

(73) Assignee: Semiconductor Energy Laboratory Co., LTD., Kanagawa-ken (JP)

(*) Notice: Subject to any disclaimer, the term of this patent is extended or adjusted under 35 U.S.C. 154(b) by 993 days.

(21) Appl. No.: 13/551,682

(22) Filed: Jul. 18, 2012

(65) Prior Publication Data

US 2013/0183226 A1    Jul. 18, 2013

(30) Foreign Application Priority Data

Jul. 22, 2011 (JP) ................. 2011-160695
Jul. 22, 2011 (JP) ................. 2011-160696
Jul. 22, 2011 (JP) ................. 2011-160697

(51) Int. Cl.
  *C01B 31/00*    (2006.01)
  *B01D 61/44*    (2006.01)
  (Continued)

(52) U.S. Cl.
  CPC .............. *C01B 31/043* (2013.01); *B01D 61/44* (2013.01); *B01D 61/445* (2013.01); *B01D 61/46* (2013.01);
  (Continued)

(58) Field of Classification Search
  CPC ....... B01D 61/44; B01D 61/445; B01D 61/45; C02F 1/4693; C02F 1/4695
  See application file for complete search history.

(56) References Cited

U.S. PATENT DOCUMENTS 3,705,846 A    12/1972    Kato et al.
6,495,013 B2   12/2002    Mazur et al.
(Continued)

FOREIGN PATENT DOCUMENTS

CN    101043948 A    9/2007
CN    101549864 A    10/2009
(Continued)

OTHER PUBLICATIONS

Chinese Office Action (Application No. 201280036403.0) Dated Jan. 20, 2015.
(Continued)

*Primary Examiner* — Keith Hendricks
*Assistant Examiner* — Salil Jain
(74) *Attorney, Agent, or Firm* — Nixon Peabody LLP; Jeffrey L. Costellia

(57) ABSTRACT

Highly-pure graphite oxide, graphene oxide, or graphene is mass-produced. Graphite is oxidized by an oxidizer, so that a graphite oxide solution is obtained, and electrodialysis is performed on the graphite oxide solution to remove aqueous ions, whereby the purity of graphite oxide is increased. Graphene oxide manufactured using the graphite oxide is mixed with powder, and the mixture is reduced, whereby graphene exhibiting conductive properties is yielded and the powder can be bonded. Such graphene can be used instead of a conduction auxiliary agent or a binder of a variety of batteries.

9 Claims, 9 Drawing Sheets

(51) Int. Cl.
- *B01D 61/46* (2006.01)
- *C01B 31/04* (2006.01)
- *B82Y 30/00* (2011.01)
- *B82Y 40/00* (2011.01)
- *H01M 4/583* (2010.01)
- *H01M 4/62* (2006.01)

(52) U.S. Cl.
CPC ............... *B82Y 30/00* (2013.01); *B82Y 40/00* (2013.01); *C01B 31/0476* (2013.01); *B01D 2311/04* (2013.01); *B01D 2311/18* (2013.01); *H01M 4/583* (2013.01); *H01M 4/621* (2013.01); *H01M 4/625* (2013.01)

(56) References Cited

U.S. PATENT DOCUMENTS

| | | | |
|---|---|---|---|
| 8,178,201 B2 | 5/2012 | Lee et al. | |
| 2006/0042957 A1* | 3/2006 | He | 205/687 |
| 2007/0131915 A1 | 6/2007 | Stankovich et al. | |
| 2010/0055458 A1* | 3/2010 | Jang et al. | 428/402 |
| 2010/0176337 A1 | 7/2010 | Zhamu et al. | |
| 2010/0303706 A1* | 12/2010 | Wallace et al. | 423/445 B |
| 2010/0317790 A1* | 12/2010 | Jang et al. | 524/496 |
| 2011/0100913 A1* | 5/2011 | Minami et al. | 210/648 |
| 2012/0031763 A1* | 2/2012 | Ohmi et al. | 204/633 |

FOREIGN PATENT DOCUMENTS

| | | | |
|---|---|---|---|
| CN | 101844762 A | 9/2010 | |
| CN | 102066245 | 5/2011 | |
| JP | 62-106602 | 7/1987 | |
| JP | 01-107809 A | 4/1989 | |
| JP | 04-171027 A | 6/1992 | |
| JP | 04-171028 A | 6/1992 | |
| JP | 2001-017839 A | 1/2001 | |
| JP | 2005-343706 | 12/2005 | |
| JP | 2010-245022 A | 10/2010 | |
| JP | 2010264385 | * 11/2010 | ............ B01D 61/44 |
| JP | 2011-500488 | 1/2011 | |
| JP | 2011-079701 | 4/2011 | |
| WO | WO-2006/026144 | 3/2006 | |
| WO | WO-2009/049375 A1 | 4/2009 | |

OTHER PUBLICATIONS

International Search Report (Application No. PCT/JP2012/068539; PCT15594/15595/15596) Dated Aug. 21, 2012.

Written Opinion (Application No. PCT/JP2012/068539; PCT15594/15595/15596) Dated Aug. 21, 2012.

* cited by examiner

GRAPHITE OXIDE, GRAPHENE OXIDE OR GRAPHENE, ELECTRIC DEVICE USING THE SAME AND METHOD OF MANUFACTURING THE SAME, AND ELECTRODIALYSIS APPARATUS

TECHNICAL FIELD

The present invention relates to graphite oxide, graphene oxide, and graphene, and a variety of electric devices using graphite oxide, graphene oxide, or graphene.

BACKGROUND ART

Graphene has been defined as a monolayer-thick sheet of $sp^2$-bonded carbon atoms that form a honeycomb hexagonal crystal lattice. Strictly speaking, graphene is as defined above; however, in this specification, a carbon film consisting of the plurality of sheets up to and including 100 sheets stacked is also referred to as graphene.

Graphene is made by a variety of methods; the Hummers method is a simple method, and many researches have been conducted on the Hummers method (see Patent Document 1 and Patent Document 2). In the Hummers method, graphite is oxidized with an oxidizer, first. Potassium permanganate is used as the oxidizer, together with which, acid such as sulfuric acid is generally added to promote oxidation effect.

The oxidized graphite (graphite oxide) retains the layered structure, in which the interlayer distance is, however, larger than that of graphite; thus, the layered structure can be easily broken by ultrasonic treatment or the like, whereby oxidized graphene (graphene oxide) can be obtained. The resulting graphene oxide may have at least a sheet of carbon atoms.

The graphene oxide is deposited on an appropriate object surface to be thin in a film shape and reduced, whereby an extremely thin carbon film (graphene) can be formed.

REFERENCE

Patent Document 1: United States Patent Application Publication No. 2007/0131915
Patent Document 2: United States Patent Application Publication No. 2010/0303706
Patent Document 3: U.S. Pat. No. 3,705,846
Patent Document 4: U.S. Pat. No. 6,495,013

DISCLOSURE OF INVENTION

As described above, the Hummers method does not need any expensive apparatus and is thus industrially promising. However, preparation of practical graphite oxide takes large amounts of time and labor, and a lot of resources for purification, as described below.

The solution resulted by the oxidation of graphite contains, as described above, various ions. These ions are in most cases unnecessary, and may worsen properties of graphene to be resulted; therefore, separation removal is needed. To separate ions, generally, it is necessary to repeat such process that the solution is diluted with pure water and separated by centrifugation and then its supernatant is removed. With this method, continuous production is difficult and a large amount of pure water is requisite.

On the other hand, dialysis has been proposed as a technique for separating ions from the graphite oxide solution (see Patent Document 2). The dialysis does not involve the step of dilution of the graphite oxide solution with pure water; however, efficient dialysis has not been disclosed.

In view of the foregoing, an object of one embodiment of the present invention is to provide a highly productive manufacturing method of graphite oxide, graphene oxide, or graphene or an apparatus or the like for the method. An object of one embodiment of the present invention is to provide an electric device formed using graphite oxide, graphene oxide, or graphene. An object of one embodiment of the present invention is to provide graphite oxide, graphene oxide, or graphene having specific composition or the like. An object of one embodiment of the present invention is to provide a novel electric device.

One embodiment of the present invention is a manufacturing method of graphite oxide, which includes a step of oxidizing graphite in a solution, a step of adding acid so as to reduce the concentration of hydrogen ions in the solution to pH3 or less, and a step of removing a cation from the solution by electrodialysis. Hydrochloric acid may be used as the acid.

One embodiment of the present invention is a manufacturing method of graphite oxide, which includes a step of oxidizing graphite in a solution, a step of adding a pH adjuster so as to adjust the concentration of hydrogen ions in the solution to pH 6 to pH 8, and a step of removing a cation and an anion from the solution by electrodialysis.

One embodiment of the present invention is a manufacturing method of graphite oxide, which includes a step of oxidizing graphite in a solution, a step of adding a pH adjuster so as to adjust the concentration of hydrogen ions in the solution to pH 6 to pH 8, a step of first electrodialysis to remove a cation and an anion from the solution, and a step of second electrodialysis using a bipolar membrane to remove a cation.

In the above, lithium hydroxide or ammonium hydroxide may be used as the pH adjuster.

Further, one embodiment of the present invention is a manufacturing method of graphene oxide, wherein graphite oxide manufactured by the above-described method is subjected to ultrasonic treatment.

Further, one embodiment of the present invention is a manufacturing method of graphene, wherein graphene oxide manufactured by the above-described method is reduced.

Graphite oxide, graphene oxide, or graphene manufactured by the above-described method can be used for a variety of electric devices. The electric device is, for example, a power storage device. The power storage device is, for example, a secondary battery using ions as carriers. As the secondary battery using ions as carriers, a lithium-ion secondary battery and a sodium-sulfur secondary battery can be given as examples thereof, though the secondary battery using ions as carriers is not limited to those.

Further, one embodiment of the present invention is an electrodialysis apparatus including an anode, an anion exchange membrane, a cation exchange membrane, and a cathode. The anion exchange membrane is provided between the anode and the cation exchange membrane, and the cation exchange membrane is provided between the cathode and the anion exchange membrane. A solution which contains graphite oxide and an anion and has a hydrogen ion concentration of pH 3 or less is injected between the cation exchange membrane and the anion exchange membrane.

Further, one embodiment of the present invention is an electrodialysis apparatus including an anode, an anion exchange membrane, a bipolar membrane, and a cathode. The anion exchange membrane is provided between the anode and the bipolar membrane, and the bipolar membrane is provided between the cathode and the anion exchange membrane. A solution which contains graphite oxide and an anion and has a hydrogen ion concentration of pH 3 or less is injected between the bipolar membrane and the anion exchange membrane.

Further, one embodiment of the present invention is an electrodialysis apparatus including an anode, an anion exchange membrane, a cation exchange membrane, and a cathode. The anion exchange membrane is provided between the anode and the cation exchange membrane, and the cation exchange membrane is provided between the cathode and the anion exchange membrane. A solution which contains graphite oxide, a cation, and an anion and has a hydrogen ion concentration in the range of pH 6 to pH 8 is injected between the cation exchange membrane and the anion exchange membrane.

In the above, one or more bipolar membranes may be provided between the anode and the anion exchange membrane or between the cathode and the cation exchange membrane.

Further, one embodiment of the present invention is an electrodialysis apparatus including an anode, a bipolar membrane, a cation exchange membrane, and a cathode. The bipolar membrane is provided between the anode and the cation exchange membrane, and the cation exchange membrane is provided between the cathode and the bipolar membrane. A solution which contains graphite oxide and a cation and has a hydrogen ion concentration of pH 6 or more is injected between the cation exchange membrane and the bipolar membrane. The electrodialysis apparatus may be used for a second electrodialysis step in another embodiment of the present invention.

According to at least one embodiment of the present invention, which has the above-described structure, highly-pure graphite oxide, graphene oxide, or graphene can be provided. Further, according to at least one embodiment of the present invention, which has the above-described structure, highly-pure graphite oxide, graphene oxide, or graphene can be manufactured continuously. Further, according to at least one embodiment of the present invention, which has the above-described structure, the mass productivity of highly-pure graphite oxide, graphene oxide, or graphene can be increased.

BEST MODE FOR CARRYING OUT THE INVENTION

Hereinafter, embodiments are described with reference to the drawings. However, the embodiments can be implemented with various modes. It will be readily appreciated by those skilled in the art that modes and details thereof can be changed in various ways without departing from the spirit and scope of the present invention. Thus, the present invention should not be interpreted as being limited to the following description of the embodiments.

Embodiment 1

Figure 1:
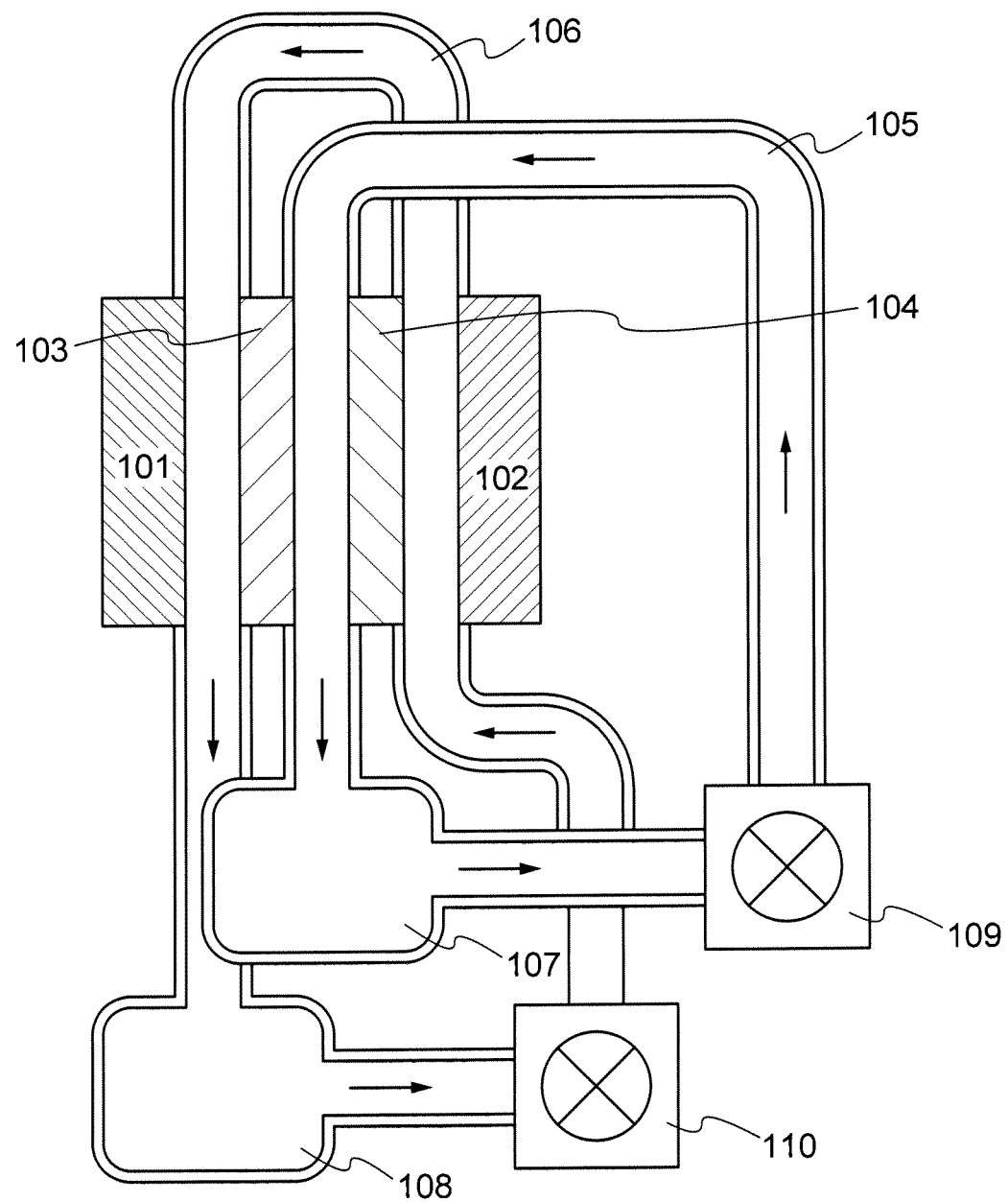
FIG. 1 is a schematic diagram of an electrodialysis apparatus used in one embodiment of the present invention.
Figure 2:
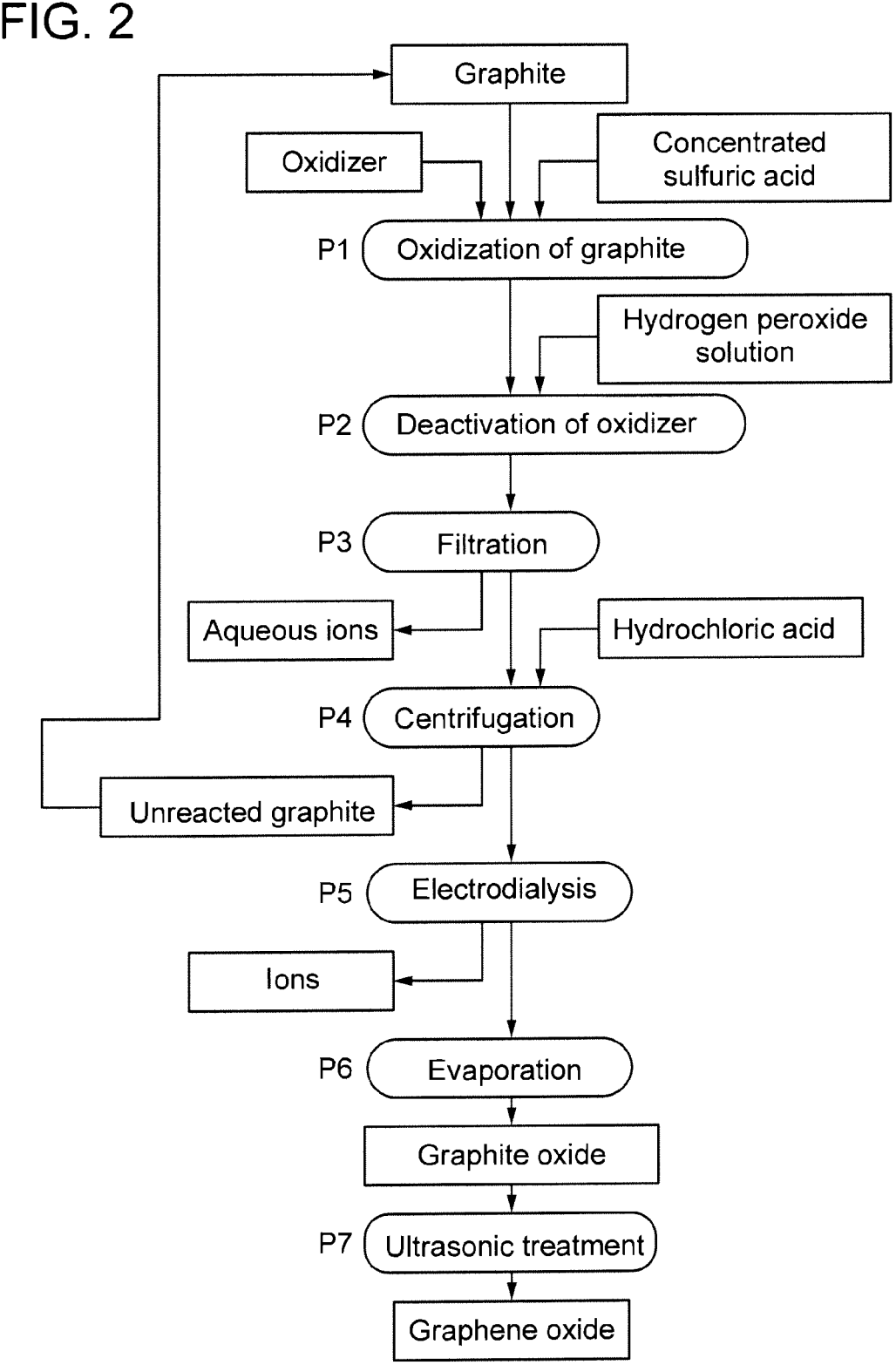
FIG. 2 illustrates a manufacturing process of graphene oxide according to one embodiment of the present invention.
Figure 4A:
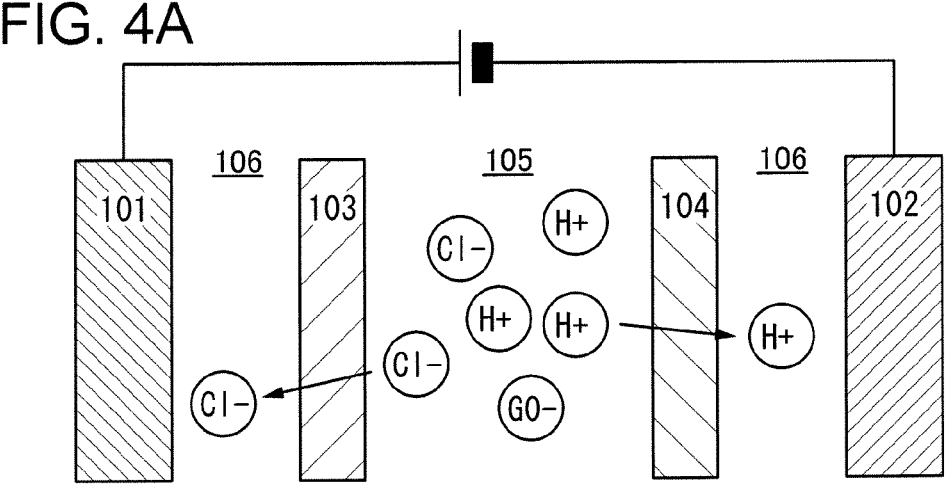
FIGS. 4A to 4C illustrate principles of embodiments of the present invention.

In this embodiment, a process for manufacturing graphene oxide is described using FIGS. 1, 2, and 4A. FIG. 2 schematically illustrates the process for manufacturing graphene oxide in this embodiment. Graphite with an average grain size of 1 μm to 100 μm may be used as a material thereof. First, concentrated sulfuric acid and an oxidizer are added to graphite, whereby graphite oxide is yielded (P1 in FIG. 2).

Further, a hydrogen peroxide solution is added thereto in order to deactivate an excess of the oxidizer (P2 in FIG. 2). The resulting solution contains ions, sediment other than graphite oxide, unreacted graphite, or the like. Therefore, first, aqueous ions are removed by filtration of the solution (P3 in FIG. 2).

Further, pure water is added to the remaining solid (including graphite oxide, the sediment other than graphite oxide, the unreacted graphite, or the like), and the hydrogen ion concentration in the solution is adjusted to pH 3 or less, whereby the sediment is dissolved. Hydrochloric acid is preferably added as the pH adjuster, but instead any other substance may be used. In this step, the solution may be further filtered to remove ions in the solution; in that case, the solvent of the resulting solid may be sufficiently evaporated, whereby the number of chlorine ions can also be reduced.

Further, the small amount of unreacted graphite contained in the solution is separated by centrifugation (P4 in FIG. 2). The unreacted graphite can be used as part of a raw material of graphene oxide. This step can be skipped in the case where the amount of unreacted graphite contained in the solution is minute.

The solution resulted in this manner is acidic and contains chlorine ions. To remove these, electrodialysis is performed thereon (P5 in FIG. 2). In that case, it is preferable that the hydrogen ion concentration in the solution be pH 3 or less.

Here, a description is given on electrodialysis. FIG. 1 schematically illustrates an electrodialysis apparatus used in the manufacturing process of graphene oxide in this embodiment. The electrodialysis apparatus includes an anode 101, a cathode 102, an anion exchange membrane 103, and a cation exchange membrane 104. In addition, the following 2 systems of tubes are included: a purified solution tube 105 which is laid between the anion exchange membrane 103 and the cation exchange membrane 104; and a waste solution tube 106 which is laid between the anode 101 and the anion exchange membrane 103 and between the cathode 102 and the cation exchange membrane 104. The purified solution tube 105 is provided with a purified solution tank 107 and a purified solution pump 109, and the waste solution tube 106 is provided with a waste solution tank 108 and a waste solution pump 110.

First, the graphite oxide solution is poured into the purified solution tank 107, and pure water or a solution containing an appropriate electrolyte is poured into the waste solution tank 108. The solution flows in the direction indicated by arrows in FIG. 1. The electrodialysis apparatus shown in FIG. 1 may be provided with a device for adding the solution from outside to one or both of the purified solution tube 105 and the waste solution tube 106 or a device for taking the solution from one or both of the purified solution tube 105 and the waste solution tube 106 to outside. Anions and cations are removed by the anion exchange membrane 103 and the cation exchange membrane 104 from the solution flowing through the purified solution tube 105 and move into the waste solution tube 106.

The electrodialysis in this embodiment is briefly described using FIG. 4A. FIG. 4A is a pattern diagram showing the anode 101, the cathode 102, the anion exchange membrane 103, the cation exchange membrane 104, the purified solution tube 105, and the waste solution tube 106, which are illustrated in FIG. 1. A voltage is applied between the anode 101 and the cathode 102. A chlorine ion ($Cl^-$) and a hydrogen ion ($H^+$) contained in the solution flowing through the purified solution tube 105 are attracted to the anode 101 and the cathode 102, respectively, reaching the anion exchange membrane 103 and the cation exchange membrane 104, respectively.

The anion exchange membrane 103 lets not cations but anions penetrate therethrough, whereas the cation exchange membrane 104 lets not anions but cations penetrate therethrough. Thus, the chlorine ion penetrates through the anion exchange membrane 103 to reach the waste solution tube 106 on the anode 101 side, whereas the hydrogen ion penetrates through the cation exchange membrane 104 to reach the waste solution tube 106 on the cathode 102 side. Accordingly, the ion concentration in the purified solution tube 105 decreases, and by contrast, the chlorine ion concentration and the hydrogen ion concentration in the waste solution tube 106 increase.

Graphite oxide contained in the purified solution tube 105, whose molecular size is large, can penetrate through neither the anion exchange membrane 103 nor the cation exchange membrane 104 to be left in the purified solution tube 105. Graphite oxide is ionized in the solution to be an anionic substance ($GO^-$).

As shown in FIG. 1, the chlorine ion and the hydrogen ion become mixed in the waste solution tube 106; therefore, the chlorine ion near the cathode 102 may reach the cation exchange membrane 104. However, the cation exchange membrane 104 does not let chlorine ions penetrate therethrough, and thus the chlorine ion remains in the waste solution tube 106.

After the chlorine ion concentration in the purified solution tube 105 is sufficiently reduced, part or all of the solution flowing through the purified solution tube 105 may be taken out, and the solution to be purified may be added in the purified solution tube 105. Further, part or all of the solution flowing through the waste solution tube 106 may be taken out, and the pure water or the solution whose ion concentration is low may be added in the waste solution tube 106. The solution taken out of the purified solution tube 105 contains graphite oxide.

The solution taken out of the waste solution tube 106 can also be used as a material in the process illustrated in FIG. 2, though containing hydrochloric acid. The resulting solution containing graphite oxide is evaporated (P6 in FIG. 2).

The resulting solid is highly-pure graphite oxide. The graphite oxide is suspended in an appropriate solvent, and ultrasonic treatment is performed thereon, whereby the layered structure of graphite oxide is broken, yielding graphene oxide (P7 in FIG. 2).

The step P6 in FIG. 2 is not requisite; the solution purified by the electrodialysis may be directly subjected to the ultrasonic treatment to yield graphene oxide.

Embodiment 2

In this embodiment, a method for purifying a solution is described, in which a bipolar membrane is used instead of a cation exchange membrane. The bipolar membrane includes an anion exchange membrane and a cation exchange membrane which are attached to each other, and behaves to separate water ($H_2O$) into a hydrogen ion ($H^+$) and a hydroxide ion ($OH^-$) by application of a voltage high enough to decompose water (see Patent Documents 3 and 4); thus, the hydrogen ion and the hydroxide ion are released from the anion exchange membrane side and the cation exchange membrane side of the bipolar membrane, respectively.

Figure 4B:
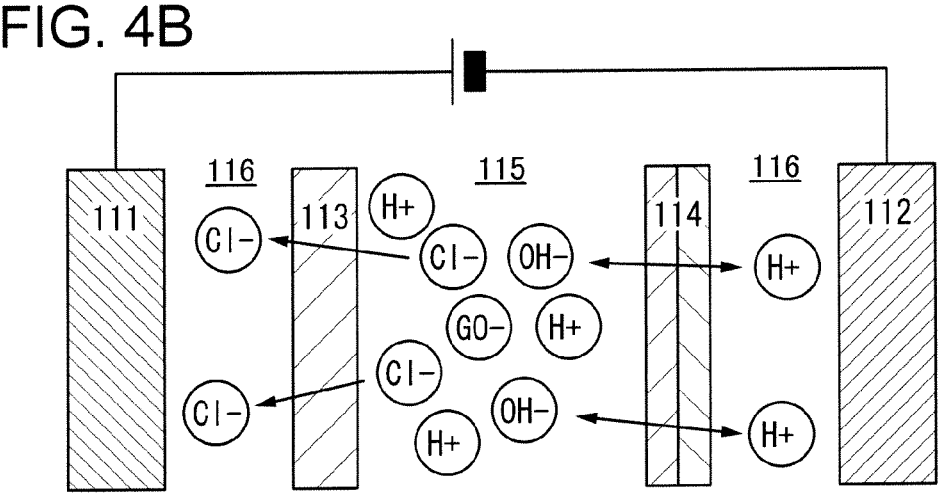

Electrodialysis in this embodiment is described using FIG. 4B. An apparatus for the electrodialysis described in this embodiment can be constructed based on FIG. 4B, as in FIG. 1. An electrodialysis apparatus used in this embodiment includes an anode 111, a cathode 112, an anion exchange membrane 113, and a bipolar membrane 114.

As shown in FIG. 4B, the bipolar membrane 114 is provided instead of the cation exchange membrane 104 in FIG. 4A. In the bipolar membrane 114, an anion exchange membrane is provided on the anode 111 side, and a cation exchange membrane is provided on the cathode 112 side.

In addition, a purified solution tube 115 is provided between the anion exchange membrane 113 and the bipolar membrane 114, and a waste solution tube 116 is provided between the anode 111 and the anion exchange membrane 113 and between the cathode 112 and the bipolar membrane 114.

First, a solution containing graphite oxide is poured into the purified solution tube 115, and pure water or a solution containing an appropriate electrolyte is poured into the waste solution tube 116.

In the above-described structure, by application of an appropriate voltage between the anode 111 and the cathode 112, a chlorine ion in the solution flowing through the purified solution tube 115 penetrates through the anion exchange membrane 113 into the waste solution tube 116. Consequently, the chlorine ion concentration in the solution in the purified solution tube 115 decreases.

Further, water is decomposed by the bipolar membrane 114, so that a hydrogen ion is supplied to the waste solution tube 116 and a hydroxide ion is supplied to the purified solution tube 115. Consequently, hydrochloric acid is yielded in the waste solution tube 116. The resulting hydrochloric acid can be used as a material in the process illustrated in FIG. 2. The hydroxide ion released into the purified solution tube 115 is, on the other hand, bonded to the hydrogen ion in the purified solution tube 115, yielding water.

According to the electrodialysis in this embodiment, chlorine ions can be removed efficiently as compared to the electrodialysis described in Embodiment 1 in the case where the concentration of cations other than a hydrogen ion in the solution to be processed is sufficiently low. In the case where the concentration of cations other than a hydrogen ion in the solution is a little bit high, by contrast, the electrodialysis in this embodiment cannot be applied in some cases because the cations other than the hydrogen ion cannot be released from the purified solution tube 115.

Embodiment 3

Likewise in this embodiment, a method is described, in which a bipolar membrane is used for ion separation from a graphite oxide solution in electrodialysis.

Figure 4C:
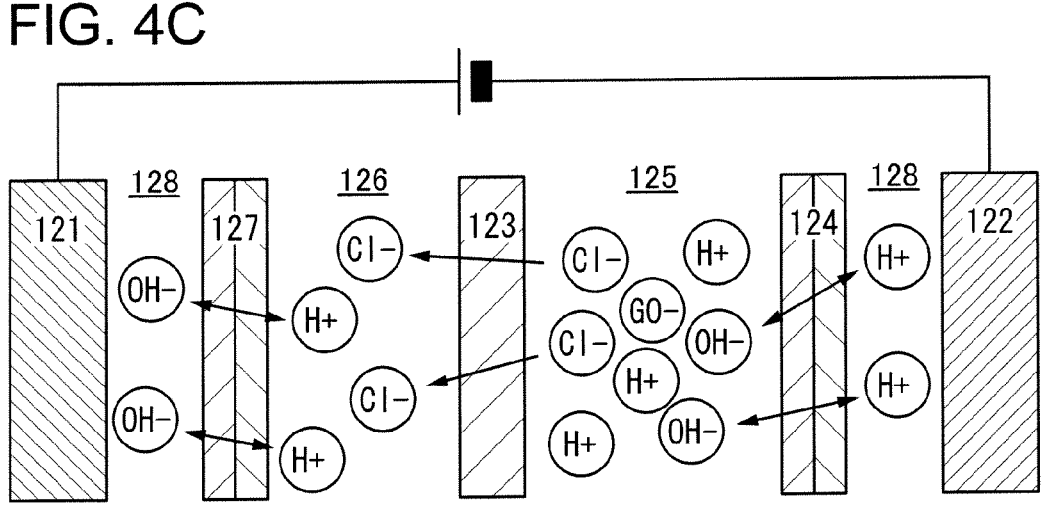

Electrodialysis in this embodiment is described using FIG. 4C. An apparatus for the electrodialysis described in this embodiment can be constructed based on FIG. 4C, as in FIG. 1. An electrodialysis apparatus used in this embodiment includes an anode 121, a cathode 122, an anion exchange membrane 123, a first bipolar membrane 124, and a second bipolar membrane 127.

As shown in FIG. 4C, the second bipolar membrane 127 is provided between the anode 121 and the anion exchange membrane 123, and the first bipolar membrane 124 is provided between the cathode 122 and the anion exchange membrane 123. An anion exchange membrane is provided on the anode 121 side in the first bipolar membrane 124, and a cation exchange membrane is provided on the cathode 122 side in the second bipolar membrane 127. In addition, a purified solution tube 125 is provided between the anion exchange membrane 123 and the first bipolar membrane 124.

A waste solution tube 126 is provided between the anion exchange membrane 123 and the second bipolar membrane 127. A neutralization tube 128 is provided between the first bipolar membrane 124 and the cathode 122 and between the second bipolar membrane 127 and the anode 121.

First, a solution containing graphite oxide is poured into the purified solution tube 125, and pure water or a solution containing an electrolyte at an appropriate concentration is poured into the waste solution tube 126 and the neutralization tube 128.

In the above-described structure, by application of an appropriate voltage between the anode 121 and the cathode 122, a chlorine ion in the solution flowing through the purified solution tube 125 penetrates through the anion exchange membrane 123 into the waste solution tube 126. Consequently, the chlorine ion concentration in the solution in the purified solution tube 125 decreases.

Further, water is decomposed by the first bipolar membrane 124, so that a hydroxide ion is supplied to the purified solution tube 125 and a hydrogen ion is supplied to the neutralization tube 128. Likewise water is decomposed by the second bipolar membrane 127, so that a hydrogen ion is supplied to the waste solution tube 126 and a hydroxide ion is supplied to the neutralization tube 128. Consequently, hydrochloric acid is yielded in the waste solution tube 126. The resulting hydrochloric acid can be used as a material in the process illustrated in FIG. 2.

The hydrogen ion and the hydroxide ion, which are supplied by the first bipolar membrane 124 and the second bipolar membrane 127 into the neutralization tube 128, immediately react with each other in neutralization to yield water. In the electrodialysis apparatus shown in FIG. 4C, a chlorine ion is not in contact with the anode 121, preventing corrosion of the anode 121 and occurrence of a chlorine gas. Therefore, the apparatus can be operated safely.

Embodiment 4

Figure 5A:
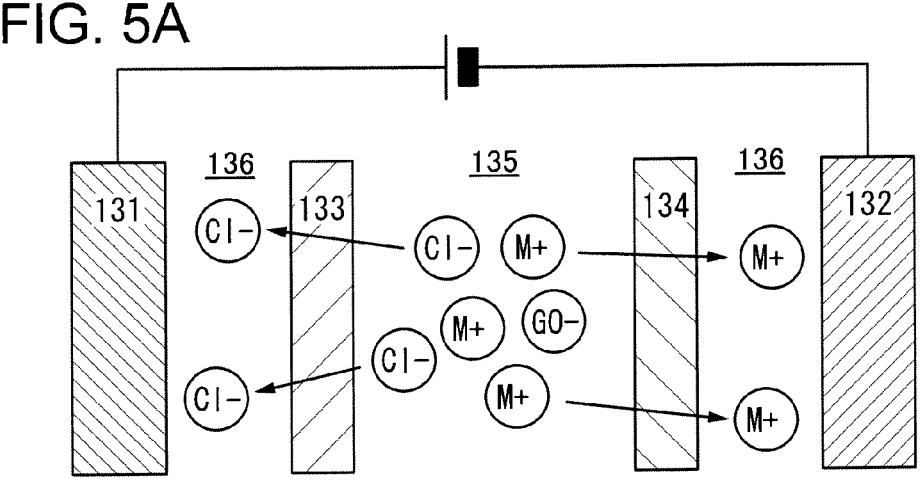
FIGS. 5A to 5C illustrate principles of embodiments of the present invention.

In this embodiment, a process for manufacturing graphene oxide is described using FIG. 5A. In this embodiment, unlike Embodiments 1 to 3, a pH adjuster is added to the solution to be purified prior to the electrodialysis (P5 in FIG. 2) to adjust the hydrogen ion concentration in the solution to pH 6 to pH 8.

Any kind of alkaline solution or alkaline salt can be used as the pH adjuster; for example, sodium hydroxide, potassium hydroxide, calcium hydroxide, lithium hydroxide, ammonium hydroxide, sodium carbonate, potassium carbonate, calcium carbonate, lithium carbonate, or the like may be used.

Depending on the application of graphite oxide, graphene oxide, or graphene, cations contained in the pH adjuster may behave as an impurity which deteriorates properties. The cations contained in the pH adjuster can be mostly removed by electrodialysis, but may be left slightly in graphite oxide, graphene oxide, or graphene.

For example, for the application of graphite oxide, graphene oxide, or graphene as a material for a lithium-ion secondary battery, it is preferable to use, as the pH adjuster, lithium hydroxide or lithium carbonate rather than sodium hydroxide, potassium hydroxide, calcium hydroxide, sodium carbonate, potassium carbonate, or calcium carbonate.

Instead ammonium hydroxide may be used in the case where a heating step at a temperature of 200° C. or higher is performed after that. The heating step enables ammonium hydroxide to be volatilized, so that ammonium hydroxide is not left in graphite oxide, graphene oxide, or graphene.

Electrodialysis in this embodiment is briefly described using FIG. 5A. An apparatus equivalent to the apparatus shown in FIG. 1 can be used for the electrodialysis in this embodiment. Hydroxide (MOH) is used as the pH adjuster in this embodiment. An anode 131, a cathode 132, an anion exchange membrane 133, a cation exchange membrane 134, a purified solution tube 135, and a waste solution tube 136 are shown in FIG. 5A. A voltage is applied between the anode 131 and the cathode 132.

A chlorine ion ($Cl^-$) and a cation ($M^+$) contained in the solution flowing through the purified solution tube 135 are attracted to the anode 131 and the cathode 132, respectively, reaching the anion exchange membrane 133 and the cation exchange membrane 134, respectively. The chlorine ion penetrates through the anion exchange membrane 133 to reach the waste solution tube 136 on the anode 131 side, whereas the cation penetrates through the cation exchange membrane 134 to reach the waste solution tube 136 on the cathode 132 side. Accordingly, the ion concentration in the purified solution tube 135 decreases, and by contrast, the ion concentration in the waste solution tube 136 increases.

After the ion concentration in the purified solution tube 135 is sufficiently reduced, part or all of the solution flowing through the purified solution tube 135 may be taken out, and the solution to be purified may be added in the purified solution tube 135. Further, part or all of the solution flowing through the waste solution tube 136 may be taken out, and the pure water or the solution whose ion concentration is low may be added in the waste solution tube 136.

The solution taken out of the waste solution tube 136, which contains the chlorine ion and the cation, may be decomposed by electrolysis, so that hydrochloric acid and hydroxide (MOH; the pH adjuster) may be taken out and used as materials for manufacturing graphite oxide. From the solution containing graphite oxide resulted in this manner, graphene oxide can be yielded.

Embodiment 5

The solution containing the cation and the chlorine ion is resulted as a waste solution in Embodiment 4. As described above, this waste solution can be subjected to electrolysis to be decomposed into hydrochloric acid and hydroxide, and then can be used in a manufacturing process of graphite oxide. On the other hand, a method in which instead of the electrolysis of the waste solution, a bipolar membrane is used, whereby hydrochloric acid and hydroxide are resulted in the step of electrodialysis (P5 in FIG. 2) is described in this embodiment.

Figure 5B:
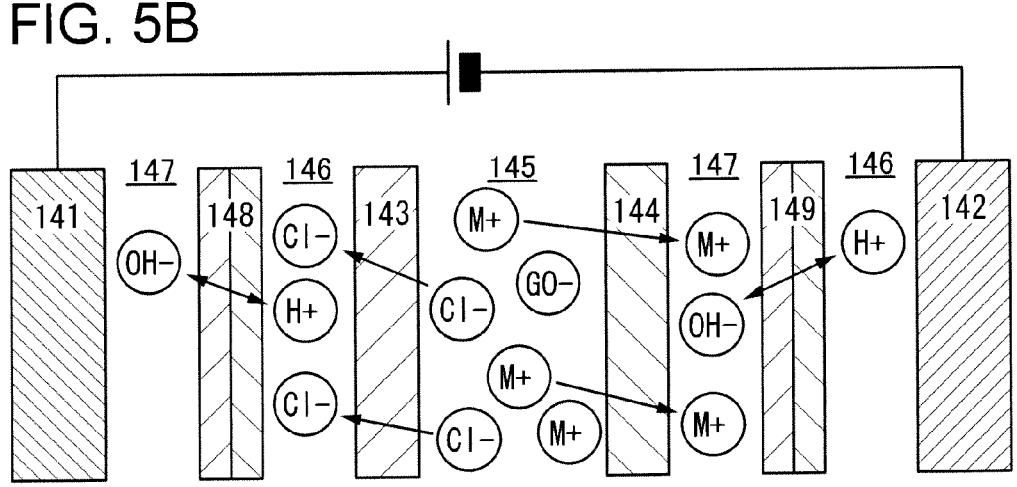

Electrodialysis in this embodiment is described using FIG. 5B. An apparatus for the electrodialysis described in this embodiment can be constructed based on FIG. 5B, as in FIG. 1. An electrodialysis apparatus used in this embodiment includes an anode 141, a cathode 142, an anion exchange membrane 143, a cation exchange membrane 144, a first bipolar membrane 148, and a second bipolar membrane 149.

As shown in FIG. 5B, the first bipolar membrane 148 is provided between the anode 141 and the anion exchange membrane 143, and the second bipolar membrane 149 is provided between the cathode 142 and the cation exchange membrane 144. An anion exchange membrane is provided on the anode 141 side in the first bipolar membrane 148, and a cation exchange membrane is provided on the cathode 142 side in the second bipolar membrane 149.

In addition, a purified solution tube 145 is provided between the anion exchange membrane 143 and the cation exchange membrane 144. An acid tube 146 is provided between the anion exchange membrane 143 and the first bipolar membrane 148 and between the second bipolar membrane 149 and the cathode 142. An alkali tube 147 is provided between the cation exchange membrane 144 and the second bipolar membrane 149 and between the first bipolar membrane 148 and the anode 141.

First, a solution containing graphite oxide is poured into the purified solution tube 145, and pure water or a solution containing an appropriate electrolyte is poured into the acid tube 146 and the alkali tube 147.

In the above-described structure, by application of an appropriate voltage between the anode 141 and the cathode 142, a chlorine ion and a cation in the solution in the purified solution tube 145 are penetrated through the anion exchange membrane 143 into the acid tube 146 and through the cation exchange membrane 144 into the alkali tube 147, respectively. Consequently, the ion concentration in the solution in the purified solution tube 145 decreases.

Further, water is decomposed by the first bipolar membrane 148 and the second bipolar membrane 149, so that a hydrogen ion is supplied to the acid tube 146 and a hydroxide ion is supplied to the alkali tube 147. Consequently, hydrochloric acid is yielded in the acid tube 146 and hydroxide is yielded in the alkali tube 147. The resulting hydrochloric acid and hydroxide can be used as materials for manufacturing graphite oxide.

Embodiment 6

A method is described in this embodiment, in which with the use of a bipolar membrane in the step of electrodialysis like Embodiment 5, ions are separated from a graphite oxide solution into cations and anions, yielding hydrochloric acid and hydroxide (MOH).

Figure 5C:
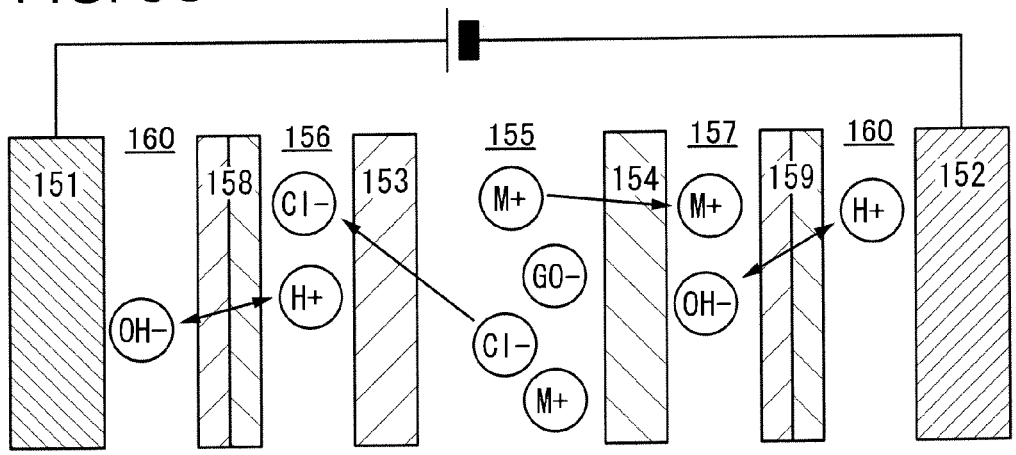

Electrodialysis in this embodiment is described using FIG. 5C. An apparatus for the electrodialysis described in this embodiment can be constructed based on FIG. 5C, as in FIG. 1. An electrodialysis apparatus used in this embodiment includes an anode 151, a cathode 152, an anion exchange membrane 153, a cation exchange membrane 154, a first bipolar membrane 158, and a second bipolar membrane 159.

As shown in FIG. 5C, the first bipolar membrane 158 is provided between the anode 151 and the anion exchange membrane 153, and the second bipolar membrane 159 is provided between the cathode 152 and the cation exchange membrane 154. An anion exchange membrane is provided on the anode 151 side in the first bipolar membrane 158, and a cation exchange membrane is provided on the cathode 152 side in the second bipolar membrane 159. Further, a purified solution tube 155 is provided between the anion exchange membrane 153 and the cation exchange membrane 154. The above-described structure is the same as that shown in FIG. 5B.

The electrodialysis apparatus shown in FIG. 5C is different from FIG. 5B in the following structure. An acid tube 156 is provided between the anion exchange membrane 153 and the first bipolar membrane 158, and an alkali tube 157 is provided between the cation exchange membrane 154 and the second bipolar membrane 159. Further, a neutral solution tube 160 is provided between the first bipolar membrane 158 and the anode 151 and between the second bipolar membrane 159 and the cathode 152.

First, a solution containing graphite oxide is poured into the purified solution tube 155, and pure water or a solution containing an electrolyte at an appropriate concentration is poured into the acid tube 156 and the alkali tube 157. Further, pure water or a solution containing an electrolyte at an appropriate concentration is poured into the neutral solution tube 160.

In the above-described structure, by application of an appropriate voltage between the anode 151 and the cathode 152, a chlorine ion and a cation in the solution in the purified solution tube 155 are penetrated through the anion exchange membrane 153 into the acid tube 156 and through the cation exchange membrane 154 into the alkali tube 157, respectively. Consequently, the ion concentration in the solution in the purified solution tube 155 decreases.

Further, water is decomposed by the first bipolar membrane 158 and the second bipolar membrane 159, so that a hydrogen ion is supplied to the acid tube 156 and a hydroxide ion is supplied to the alkali tube 157. Consequently, hydrochloric acid is yielded in the acid tube 156 and hydroxide is yielded in the alkali tube 157. The resulting hydrochloric acid and hydroxide can be used as materials for manufacturing graphite oxide.

The hydroxide ion and the hydrogen ion, which are supplied by the first bipolar membrane 158 and the second bipolar membrane 159 into the neutral solution tube 160, immediately react with each other in neutralization to yield water. In the electrodialysis apparatus shown in FIG. 5C, a chlorine ion is not in contact with the anode 151, preventing corrosion of the anode 151 and occurrence of a chlorine gas. Therefore, the apparatus can be operated safely.

Embodiment 7

Figure 3:
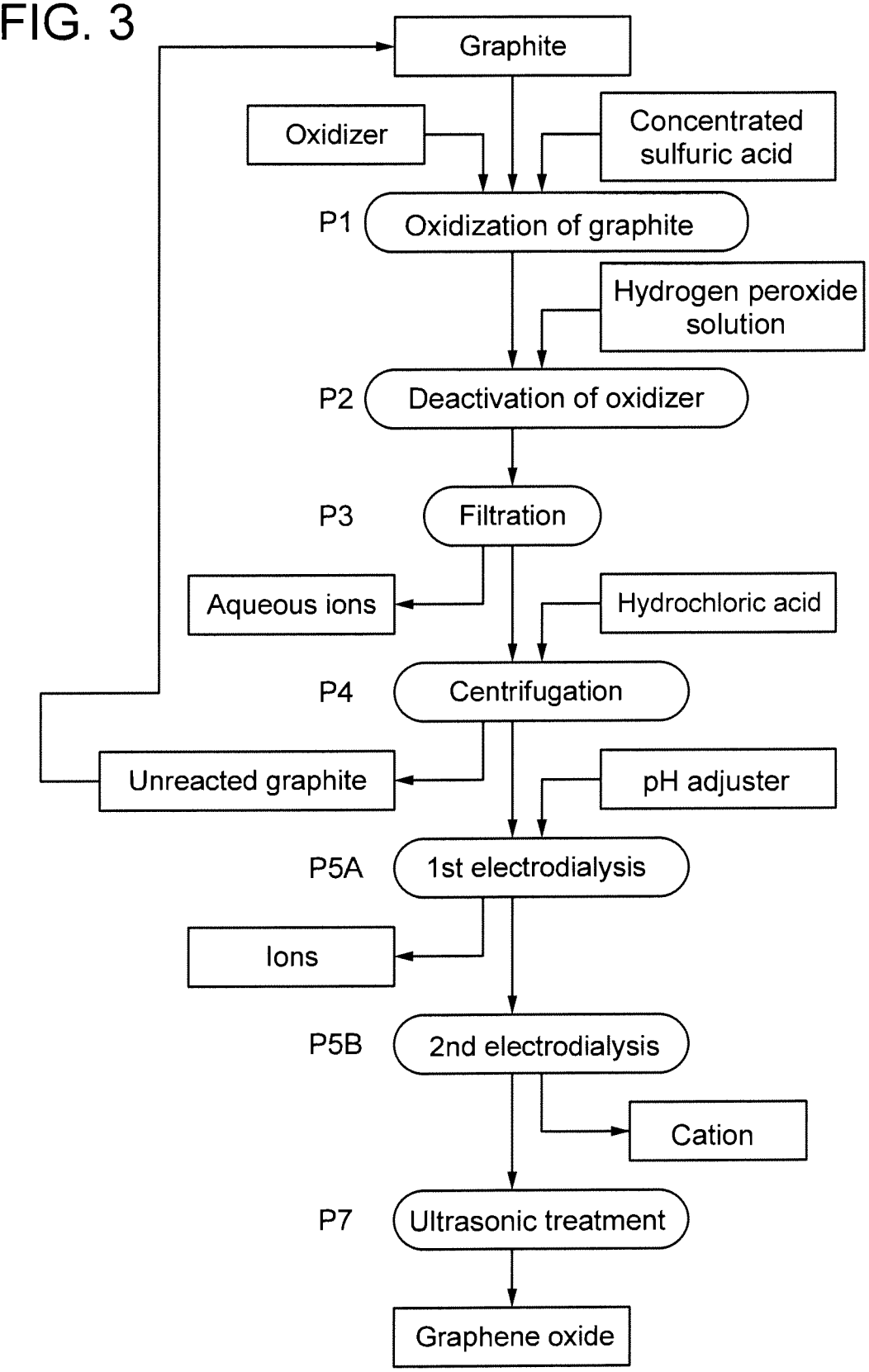
FIG. 3 illustrates a manufacturing process of graphene oxide according to one embodiment of the present invention.
Figure 6A:
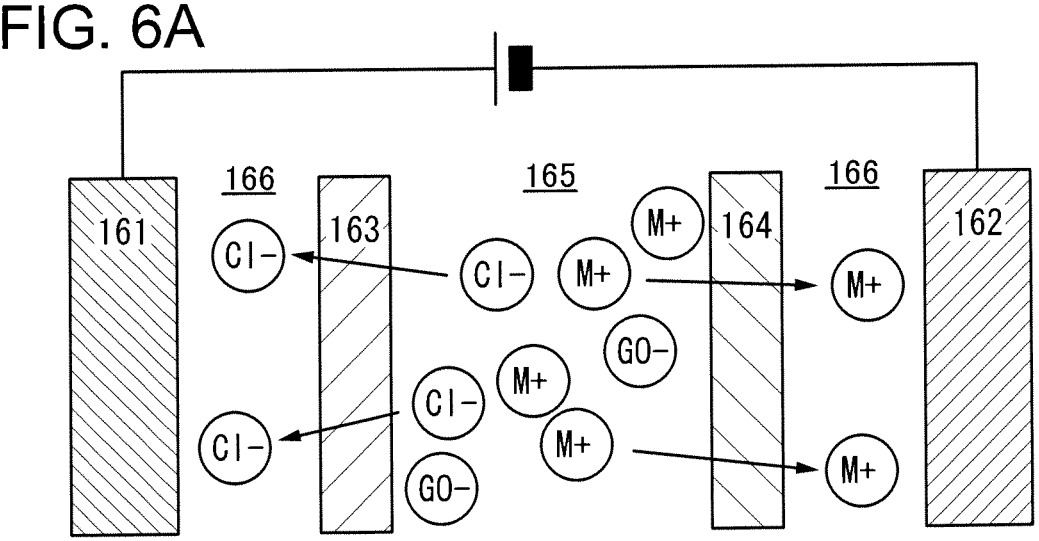
FIGS. 6A and 6B illustrate principles of embodiments of the present invention.
Figure 6B:
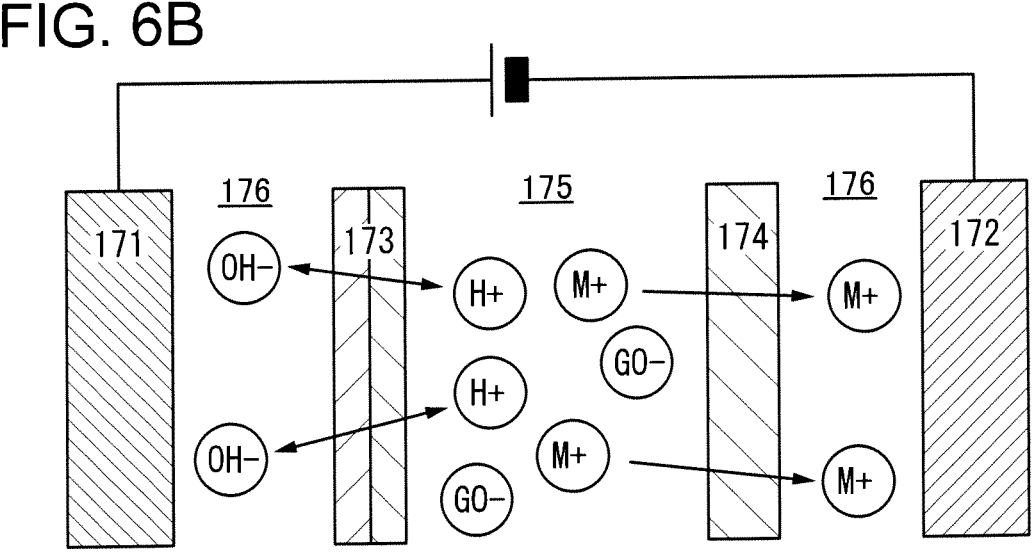

In this embodiment, a process for manufacturing graphene oxide is described using FIG. 3 and FIGS. 6A and 6B. Electrodialysis is performed in two steps in this embodiment. FIG. 3 schematically illustrates the process for manufacturing graphene oxide in this embodiment. Refer to Embodiment 1 for the process other than the electrodialysis. First, concentrated sulfuric acid and an oxidizer are added to graphite, whereby graphite oxide is yielded (P1 in FIG. 3).

Further, a hydrogen peroxide solution is added thereto in order to deactivate an excess of the oxidizer (P2 in FIG. 3). The resulting solution contains ions, sediment other than graphite oxide, unreacted graphite, or the like. Therefore, first, most of the aqueous ions are removed by filtration of the solution (P3 in FIG. 3).

Further, pure water is added to the remaining solid (including graphite oxide, the sediment other than graphite oxide, the unreacted graphite, or the like), and the hydrogen ion concentration in the solution is adjusted to pH 3 or less, whereby the sediment is dissolved. Hydrochloric acid is preferably added as the pH adjuster.

To remove chlorine ions from the resulting solution, electrodialysis is used. In this embodiment, the electrodialysis is performed in two steps: a first electrodialysis step (P5A in FIG. 3) and a second electrodialysis step (P5B in FIG. 3). Prior to the first electrodialysis step, a pH adjuster is added thereto, so that the hydrogen ion concentration in the solution is preferably pH 6 to pH 8.

The first electrodialysis step is described briefly using FIG. 6A. An apparatus equivalent to the apparatus shown in FIG. 1 can be used for the first electrodialysis step. Hydroxide (MOH) is used as the pH adjuster in this embodiment. An anode 161, a cathode 162, an anion exchange membrane 163, a cation exchange membrane 164, a purified solution tube 165, and a waste solution tube 166 are shown in FIG. 6A. A voltage is applied between the anode 161 and the cathode 162. A chlorine ion ($Cl^-$) and a cation ($M^+$) contained in the solution flowing through the purified solution tube 165 are penetrated through the anion exchange membrane 163 into the waste solution tube 166 on the anode 161 side and through the cation exchange membrane 164 into the waste solution tube 166 on the cathode 162 side, respectively. Accordingly, the ion concentration in the purified solution tube 165 decreases, and by contrast, the ion concentration in the waste solution tube 166 increases.

After the ion concentration in the purified solution tube 165 is sufficiently reduced, part or all of the solution flowing through the purified solution tube 165 may be taken out, and the solution to be purified may be added in the purified solution tube 165. The solution taken out of the purified solution tube 165 contains a slight number of cations in addition to graphite oxide, and most of the cations are derived from the pH adjuster. Graphite oxide is ionized in a solution to be an anionic substance ($GO^-$), for which an appropriate number of cations is requisite in order to keep the electroneutrality; therefore, a slight number of cations are inevitably left. These cations are removed by the second electrodialysis step.

Further, also when the ion concentration of the solution flowing through the waste solution tube 166 becomes high, part or all of the solution flowing through the waste solution tube 166 may be taken out, and the pure water or the solution whose ion concentration is low may be added in the waste solution tube 166. The solution taken out of the waste solution tube 166 contains a chlorine ion and a cation, and may be decomposed by electrolysis, so that hydrochloric acid and hydroxide (MOH) can be taken out and used as materials for the process shown in FIG. 3.

When the first electrodialysis step is performed by a method using a bipolar membrane as described in Embodiment 5 (or FIG. 5B) or Embodiment 6 (or FIG. 5C), hydrochloric acid and hydroxide are yielded in this step. That is, the apparatus described in Embodiment 5 or the apparatus described in Embodiment 6 may be used as the apparatus for the first electrodialysis step. In the case where the first electrodialysis step is performed with the apparatus described in Embodiment 5, the second electrodialysis step may be performed on the solution left in the purified solution tube 145; the same applies to the case where the first electrodialysis step is performed with the apparatus described in Embodiment 6.

An electrodialysis apparatus used in the second electrodialysis step (P5B in FIG. 3) includes a bipolar membrane 173 instead of the anion exchange membrane 163 in the electrodialysis apparatus shown in FIG. 1. Principle of the second electrodialysis step is described using FIG. 6B. An anode 171, a cathode 172, the bipolar membrane 173, a cation exchange membrane 174, a purified solution tube 175, and a waste solution tube 176 are shown in FIG. 6B. In the bipolar membrane 173, an anion exchange membrane is provided on the anode 171 side, and a cation exchange membrane is provided on the cathode 172 side.

A voltage is applied between the anode 171 and the cathode 172. It is preferable that the hydrogen ion concentration in the solution flowing through the purified solution tube 175 be pH 6 or more. This solution contains a cation ($M^+$) and an ionized graphite oxide ($GO^-$); the cation ($M^+$) is attracted to the cathode 172, so that the cation ($M^+$) penetrates through the cation exchange membrane 174 into the waste solution tube 176.

On the other hand, water is decomposed by the bipolar membrane 173, so that a hydroxide ion ($OH^-$) is released to the anode 171 side (i.e., into the waste solution tube 176), whereas a hydrogen ion ($H^+$) is released to the cathode 172 side (i.e., into the purified solution tube 175). Consequently, highly-pure graphite oxide is left in the purified solution tube 175, whereas hydroxide is yielded in the waste solution tube 176. The hydroxide yielded in the waste solution tube 176 can be used as the above-described pH adjuster.

The solution resulted in this manner contains highly-pure graphite oxide. Ultrasonic treatment is performed on the solution containing this graphite oxide, whereby the layered structure of graphite oxide is broken, yielding graphene oxide (P7 in FIG. 3).

Embodiment 8

Figure 7A:
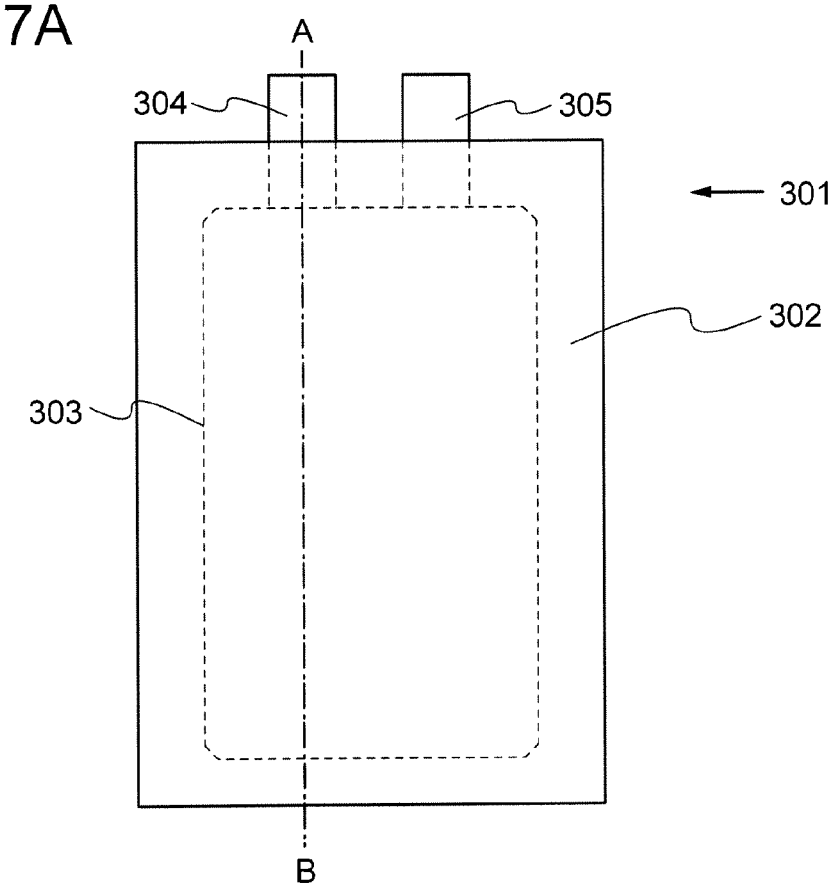
FIGS. 7A and 7B illustrate an example of a secondary battery.

In this embodiment, a method for manufacturing a power storage device (hereinafter referred to as a lithium-ion secondary battery) is described using FIGS. 7A and 7B. FIG. 7A is a plan view of a power storage device 301, and FIG. 7B is a cross-sectional view taken along dot-dashed line A-B in FIG. 7A.

In the power storage device 301 shown in FIG. 7A, a power storage cell 303 is contained in an exterior member 302. The power storage device 301 further has terminal portions 304 and 305 which are connected to the power storage cell 303. For the exterior member 302, a laminate film, a polymer film, a metal film, a metal case, a plastic case, or the like can be used.

Figure 7B:
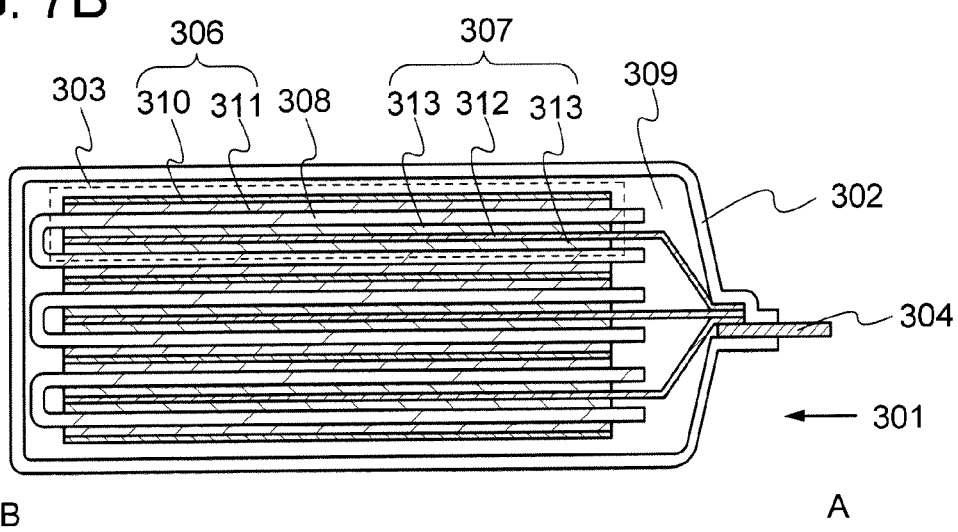

As illustrated in FIG. 7B, the power storage cell 303 includes a negative electrode 306, a positive electrode 307, a separator 308 provided between the negative electrode 306 and the positive electrode 307, and an electrolyte 309 with which the power storage device 301 surrounded by the exterior member 302 is filled.

The negative electrode 306 includes a negative electrode current collector 310 and a negative electrode active material layer 311. The positive electrode 307 includes a positive electrode current collector 312 and a positive electrode active material layer 313. The negative electrode active material layer 311 is provided on one or both of the surfaces of the negative electrode current collector 310. The positive electrode active material layer 313 is provided on one or both of the surfaces of the positive electrode current collector 312.

The negative electrode current collector 310 is connected to the terminal portion 304. The positive electrode current collector 312 is connected to the terminal portion 305. The terminal portions 304 and 305 are drawn out of the exterior member 302.

Aluminum, stainless steel, or the like is used for the positive electrode current collector 312. The positive electrode current collector 312 may have a foil shape, a plate shape, a net shape, or the like. Copper, titanium, or the like can be used for the negative electrode current collector 310.

As a solute of the electrolyte 309, a material in which lithium ions that are carrier ions can transfer and exist stably is used. Typical examples of the solute of the electrolyte are lithium salt such as $LiClO_4$, $LiAsF_6$, $LiBF_4$, $LiPF_6$, and $Li(C_2F_5SO_2)_2N$. Instead in the case where carrier ions are alkali metal ions other than lithium or alkaline earth metal ions, alkali metal salt such as sodium salt or potassium salt; alkaline earth metal salt such as calcium salt, strontium salt, or barium salt; beryllium salt; magnesium salt; or the like can be used as appropriate, as the solute of the electrolyte 309.

As a solvent of the electrolyte 309, a material in which carrier ions can transfer is used. As the solvent of the electrolyte 309, an aprotic organic solvent is preferably used. Typical examples of the aprotic organic solvent are ethylene carbonate, propylene carbonate, dimethyl carbonate, diethyl carbonate, γ-butyrolactone, acetonitrile, dimethoxyethane, tetrahydrofuran, and the like; one or more of these can be used.

A gelled polymer can be used as the solvent of the electrolyte 309, whereby risk of liquid leakage is reduced, so that safety is increased. In addition, the power storage device 301 can be made thin and lightweight. Typical examples of the gelled polymer are a silicon gel, an acrylic gel, an acrylonitrile gel, polyethylene oxide, polypropylene oxide, a fluorine-based polymer, and the like. A solid electrolyte such as $Li_3PO_4$ can also be used as the electrolyte 309.

An insulating porous material can be used for the separator 308. The separator 308 can be formed using an organic material such as cellulose (paper), polyethylene, or polypropylene. An inorganic material such as glass fibers may be used as well.

A manufacturing method of the negative electrode active material layer 311, the positive electrode active material layer 313 is briefly described below. First, graphene oxide to be used as an additive is manufactured. Refer to Embodiments 1 to 7 for the manufacturing of graphene oxide. Graphene oxide which is end-capped with functional groups, can be suspended in a polar solvent such as water, chloroform, N,N-dimethylformamide (DMF), or N-methylpyrrolidone (NMP).

Next, the resulting graphene oxide and active material particles are mixed. The active material particles are mixed such that the proportion of the active material particles in the mixture is preferably 90% or higher, further preferably 95% or higher. Before the mixing, only the graphene oxide is preferably suspended in water or a solution of NMP or the like; then, the active material particles are mixed into the suspension, whereby slurry is obtained. Another conduction auxiliary agent such as acetylene black or a binder may be additionally mixed as appropriate.

Graphene oxide has a large number of various functional groups as described above; among these, a carboxyl group or a hydroxy group enables the graphene oxide to behave as an ideal dispersant. Accordingly, generation of a secondary particle can be suppressed particularly in the case where fine particles with a grain size of 100 nm or less are mixed therein.

A variety of materials can be used as the active material. For example, as a positive electrode active material, lithium cobaltate, lithium iron phosphate, lithium manganese phosphate, lithium manganese silicate, lithium iron silicate, or the like can be used; however, embodiments of the present invention are not limited thereto. As a negative electrode active material, silicon, tin, germanium, graphite, or the like can be used.

The size of the active material particle is preferably 20 nm to 100 nm. Further, a carbohydrate such as glucose may be mixed in manufacturing the positive electrode active material particles so that the positive electrode active material particles are coated with carbon, leading to an increase in conductivity.

The resulting slurry containing the positive electrode active material particle and graphene oxide is applied on the positive electrode current collector 312, whereas the resulting slurry containing the negative electrode active material particle and graphene oxide is applied on the negative electrode current collector 310. The thickness can be set as appropriate, and is preferably 1 μm to 1 mm. Then, the solvent of the slurry is evaporated. The resulting one may be pressed if needed.

After that, in order to reduce the graphene oxide, reduction is performed thereon in a vacuum or a reducing atmosphere such as nitrogen or argon at 150° C. to 900° C. The temperature is set in accordance with the heat resistance of the current collector or the active material, the conductivity requisite for the graphene oxide, or the like.

In this reduction process, adjacent graphene oxide molecules are bonded to each other, whereby larger graphene grows and a three-dimensional network like a net is formed. Through this process, active material particles are tangled in the molecules, resulting in higher bonding strength between the active material particles.

Depending on the reduction temperature, the conductivity of resulting graphene changes; the same can also apply to its flexibility, strength, and the like. The reduction temperature may be set considering the requisite conductivity, flexibility, strength, and the like. In the case where the conductivity of graphene used as a binder is not sufficiently high, a known conduction auxiliary agent is preferably added at a required amount so as to compensate the conductivity.

Although a sealed thin power storage device is described as the power storage device 301 in this embodiment, power storage devices having a variety of structures, such as a button power storage device, a cylindrical power storage device, or a rectangular power storage device can be provided. Further, although the structure where the positive electrode, the negative electrode, and the separator are stacked is described in this embodiment, a structure where the positive electrode, the negative electrode, and the separator are rolled may be employed.

A lithium-ion secondary battery has a small memory effect, a high energy density, a large discharged capacity, and a high output voltage. Thus, the size and weight of the lithium-ion secondary battery can be reduced. Further, the lithium-ion secondary battery less degrades due to its repetitive charge and discharge and can be used for a long time, leading to cost reduction.

Next, a structure of a capacitor which is another example of the power storage device is described. Typical examples of the capacitor are a double-layer capacitor, a lithium-ion capacitor, and the like. The lithium-ion capacitor is described below. The lithium-ion capacitor has high efficiency of charge and discharge, capability of rapid charge and discharge, and a long life by repetitive use.

In the case of a capacitor, instead of the positive electrode active material layer 313 in the lithium-ion secondary battery in FIG. 7B, a material capable of reversibly absorbing lithium ions and/or anions is preferably used. Typical examples of the positive electrode active material layer 313 are active carbon, a conductive polymer, or a polyacene organic semiconductor (PAS). Fine particles of any of these may be mixed with graphene oxide, so that slurry is manufactured as described above, and the slurry may be applied on the positive electrode current collector and reduced. Further, the above-described electrode including the negative electrode current collector and the negative electrode active material layer may be used as the negative electrode.

The power storage device including an electrode which is one embodiment of the disclosed invention is not limited to the above-described one. For example, the above-described electrode including the negative electrode current collector and the negative electrode active material layer can be used as a negative electrode of an air cell which is another embodiment of the power storage device. Also in that case, a power storage device with improved cycle characteristics can be manufactured.

Embodiment 9

The power storage device described in Embodiment 8 can be used as a power supply of various electronic and electric devices which are driven by electric power.

Specific examples of electronic and electric devices using the power storage device according to one embodiment of the present invention are as follows: display devices, lighting devices, desktop personal computers or laptop personal computers, image reproduction devices which reproduce a still image or a moving image stored in a recording medium such as a digital versatile disc (DVD), mobile phones, portable game machines, portable information terminals, e-book readers, cameras such as video cameras and digital still cameras, high-frequency heating apparatuses such as microwaves, electric rice cookers, electric washing machines, air-conditioning systems such as air conditioners, electric refrigerators, electric freezers, electric refrigerator-freezers, medical equipments such as freezers for preserving DNA and dialysis devices, and the like.

In addition, moving objects driven by an electric motor using electric power from a power storage device are also included in the category of the electronic and electric devices. As examples of the moving objects, electric vehicles, hybrid vehicles (hybrid cars) which include both an internal-combustion engine and a motor, motorized bicycles including motor-assisted bicycles, and the like can be given.

In the electronic and electric devices, the power storage device according to one embodiment of the present invention can be used as a power storage device for supplying power for almost all of the power consumption (such a power storage device referred to as a main power supply). Further or alternatively, in the electronic and electric devices, the power storage device according to one embodiment of the present invention can be used as a power storage device which can supply electric power to the electronic and electric device when the supply of power from the main power supply or a commercial power supply is stopped (such a power storage device is referred to as an uninterruptible power supply). Further or alternatively, in the electronic and electric devices, the power storage device according to one embodiment of the present invention can be used as a power storage device for supplying electric power to the electronic and electric devices at the same time as the electric power supply from the main power supply or a commercial power supply (such a power storage device is referred to as an auxiliary power supply).

Figure 8:
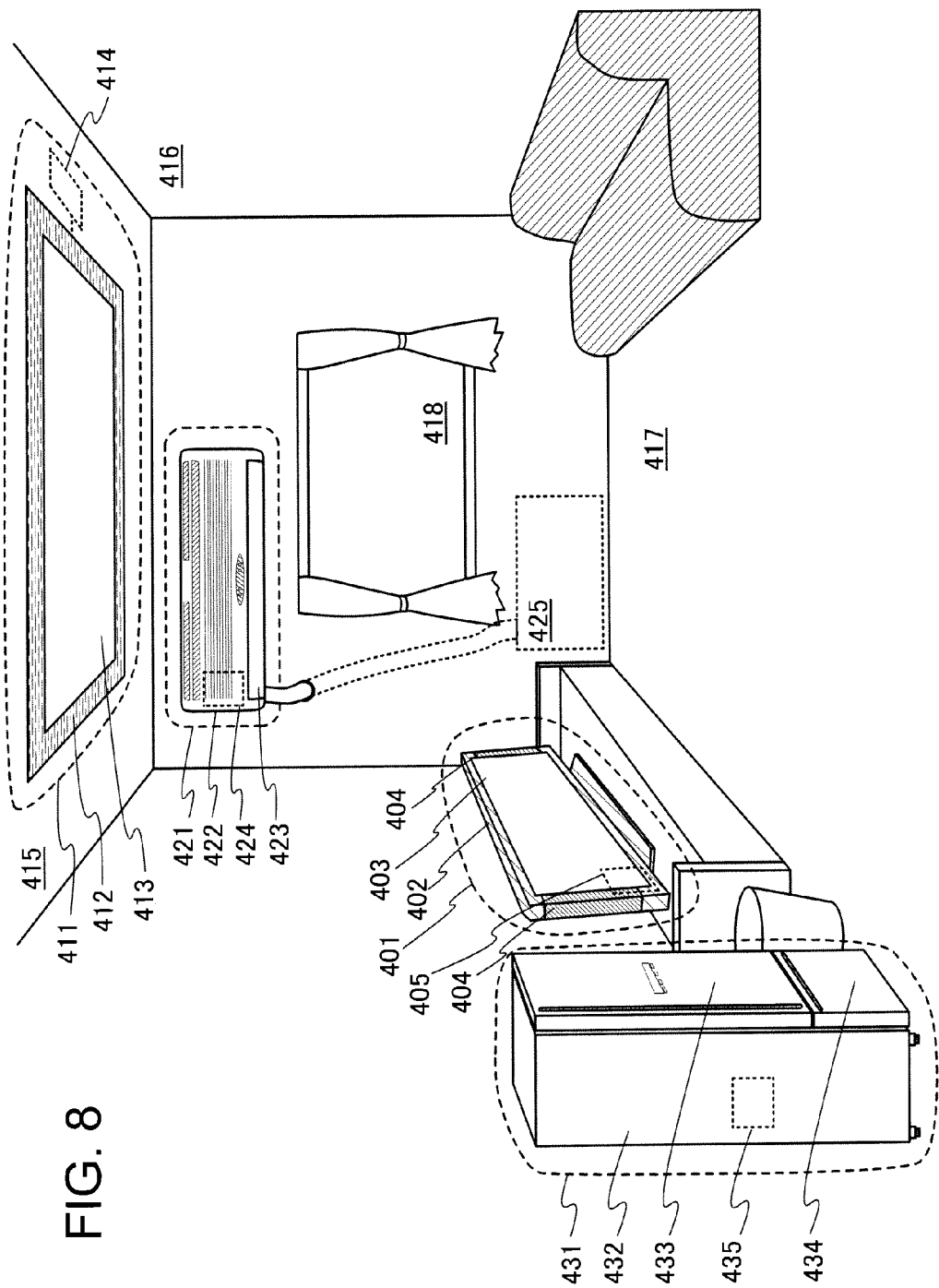
FIG. 8 illustrates application modes of a power storage device.

FIG. 8 illustrates specific structures of the electronic and electric devices. In FIG. 8, a display device 401 is an example of electronic and electric devices including a power storage device 405 according to one embodiment of the present invention. Specifically, the display device 401 corresponds to a display device for TV broadcast reception and includes a housing 402, a display portion 403, speaker portions 404, the power storage device 405, and the like. The power storage device 405 according to one embodiment of the present invention is provided inside the housing 402.

The display device 401 can receive electric power from a commercial power supply. The display device 401 can also use electric power stored in the power storage device 405. Thus, even when electric power cannot be supplied from the commercial power supply because of power outage or the like, the display device 401 can be driven with the use of the power storage device 405 according to one embodiment of the present invention as an uninterruptible power supply.

A semiconductor display device such as a liquid crystal display device, a light-emitting device in which a light-emitting element such as an organic EL element is provided in each pixel, an electrophoresis display device, a digital micromirror device (DMD), a plasma display panel (PDP), a field emission display (FED), and the like can be used for the display portion 403.

The display device includes in its category any information display device for personal computers, advertisement displays, and the like in addition to display devices for TV broadcast reception.

In FIG. 8, an installation lighting device 411 is an example of an electric device including a power storage device 414 according to one embodiment of the present invention. Specifically, the lighting device 411 includes a housing 412, a light source 413, the power storage device 414, and the like. FIG. 8 illustrates the case where the power storage device 414 is provided inside a ceiling 415 on which the housing 412 and the light source 413 are installed; alternatively, the power storage device 414 may be provided in the housing 412.

The lighting device 411 can receive electric power from a commercial power supply. The lighting device 411 can also use electric power stored in the power storage device 414. Thus, even when electric power cannot be supplied from the commercial power supply because of power outage or the like, the lighting device 411 can be driven with the use of the power storage device 414 according to one embodiment of the present invention as an uninterruptible power supply.

Although the installation lighting device 411 provided on the ceiling 415 is shown in FIG. 8 as an example, the power storage device according to one embodiment of the present invention can be used for an installation lighting device provided for, for example, a side wall 416, a floor 417, a window 418, or the like other than the ceiling 415. The power storage device can also be used in a tabletop lighting device and the like.

As the light source 413, an artificial light source which emits light artificially by electric power can be used. Specifically, a discharge lamp such as an incandescent lamp and a fluorescent lamp, and a light-emitting element such as an LED and an organic EL element are given as examples of the artificial light source.

In FIG. 8, an air conditioner including an indoor unit 421 and an outdoor unit 425 is an example of an electric device including a power storage device 424 according to one embodiment of the present invention. Specifically, the indoor unit 421 includes a housing 422, a ventilation duct 423, the power storage device 424, and the like. FIG. 8 illustrates the case where the power storage device 424 is provided in the indoor unit 421; alternatively, the power storage device 424 may be provided in the outdoor unit 425. Further alternatively, the power storage devices 424 may be provided in both the indoor unit 421 and the outdoor unit 425.

The air conditioner can receive electric power from the commercial power supply. The air conditioner can also use electric power stored in the power storage device 424. Specifically, in the case where the power storage devices 424 are provided in both the indoor unit 421 and the outdoor unit 425, the air conditioner can be driven with the use of the power storage device 424 according to one embodiment of the present invention as an uninterruptible power supply even when electric power cannot be supplied from the commercial power supply because of power outage or the like.

Although the separated air conditioner including the indoor unit and the outdoor unit is illustrated in FIG. 8 as an example, the power storage device according to one embodiment of the present invention can be used in an air conditioner in which one housing is equipped with the functions of an indoor unit and an outdoor unit.

In FIG. 8, an electric refrigerator-freezer 431 is an example of an electric device including a power storage device 435 according to one embodiment of the present invention. Specifically, the electric refrigerator-freezer 431 includes a housing 432, a door for a refrigerator 433, a door for a freezer 434, the power storage device 435, and the like. The power storage device 435 is provided in the housing 432 in FIG. 8. The electric refrigerator-freezer 431 can receive electric power from a commercial power supply. The electric refrigerator-freezer 431 can also use electric power stored in the power storage device 435. Thus, even when electric power cannot be supplied from the commercial power supply because of power outage or the like, the electric refrigerator-freezer 431 can be driven with the use of the power storage device 435 according to one embodiment of the present invention as an uninterruptible power supply.

Among the above-described electronic and electric devices, a high-frequency heating apparatus such as a microwave and an electronic device such as an electric rice cooker require high electric power in a short time. The tripping of a circuit breaker of a commercial power supply in use of such an electronic device can be prevented by using the power storage device according to one embodiment of the present invention as an auxiliary power supply for covering a short of electric power supplied by the commercial power supply.

In addition, in a time period when electronic and electronic devices are not used, specifically when the rate of actual use of electric power in the total amount of electric power which can be supplied by a commercial power supply source (such a rate referred to as a usage rate of electric power) is low, electric power can be stored in the power storage device, whereby the usage rate of electric power can be reduced, in turn, in a time period when the electronic and electronic devices are used. In the case of the electric refrigerator-freezer 431, for example, electric power can be stored in the power storage device 435 at night time when the temperature is low and opening and closing of the door for a refrigerator 433 and the door for a freezer 434 are not performed. Then, the power storage device 435 can be used as an auxiliary power supply in daytime when the temperature is high and opening and closing of the door for a refrigerator 433 and the door for a freezer 434 are performed; thus, the usage rate of electric power in daytime can be reduced.

Embodiment 10

Figure 9:
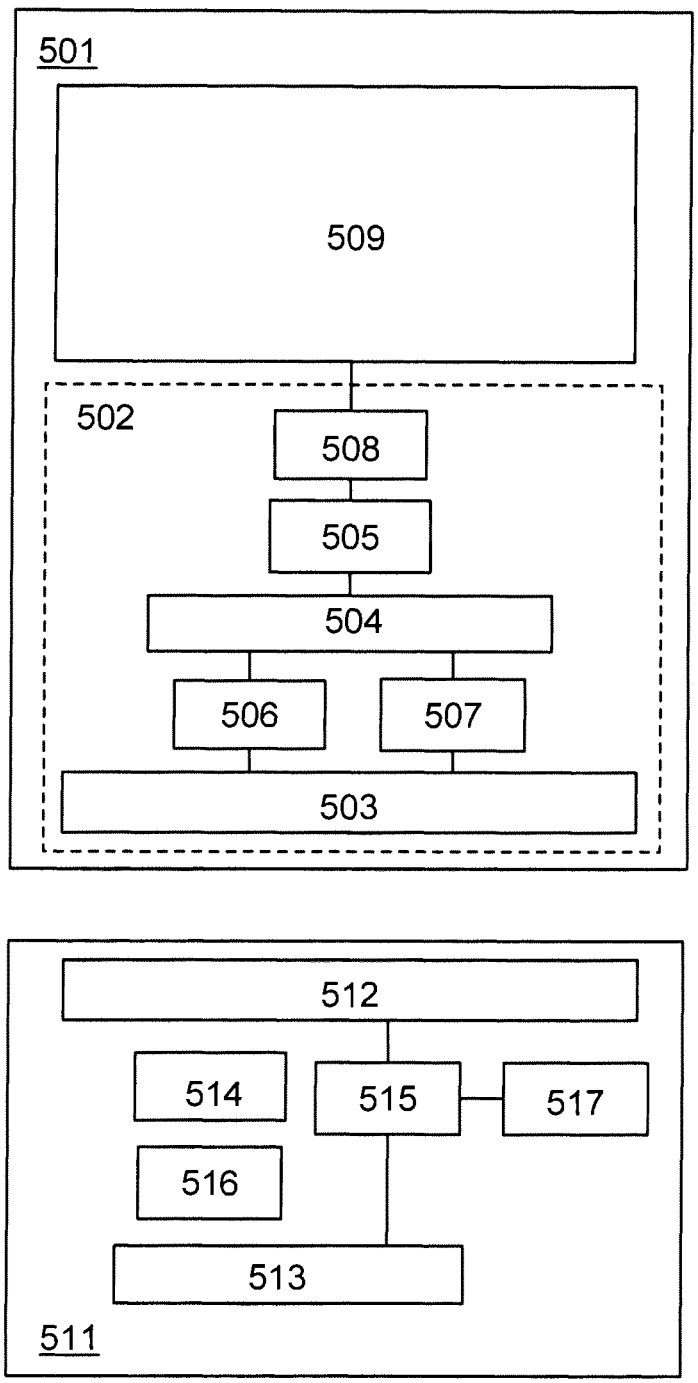
FIG. 9 illustrates a structure of a wireless power feeding system.

In this embodiment, an example of a case where the power storage device (secondary battery) described in Embodiment 8 is used in a wireless power feeding system (hereinafter referred to as an RF power feeding system) is described using a block diagram of FIG. 9. In FIG. 9, elements in a power receiving device and a power feeding device are classified depending on their functions to be included in different blocks. However, it may be practically difficult to classify the elements completely depending on their functions, and one element may involve a plurality of functions.

First, an outline of the RF power feeding system is described. A power receiving device 501 is included in an electronic device, an electric propulsion vehicle, or the like which is driven by electric power supplied from a power feeding device 511, and can also be applied to any other device which is driven by electric power, as appropriate.

Typical examples of the electronic device are cameras such as digital cameras or video cameras, digital photo frames, mobile phones (also referred to as cellular phones or cellular phone devices), portable game machines, portable information terminals, audio reproducing devices, display devices, and computers.

Typical examples of the electric propulsion vehicle include electric vehicles, hybrid electric vehicles, train vehicles, maintenance vehicles, carts, wheelchairs, and the like. In addition, the power feeding device 511 has a function of supplying electric power to the power receiving device 501.

In FIG. 9, the power receiving device 501 includes a power receiving device portion 502 and a power load portion 509. The power receiving device portion 502 includes at least a power receiving device antenna circuit 503, a signal processing circuit 504, and a secondary battery 505. The power feeding device 511 includes at least a power feeding device antenna circuit 512 and a signal processing circuit 513.

The power receiving device antenna circuit 503 receives signals transmitted by the power feeding device antenna circuit 512 or transmits signals to the power feeding device antenna circuit 512. The signal processing circuit 504 processes signals received by the power receiving device antenna circuit 503 and controls charge of the secondary battery 505 and supply of electric power from the secondary battery 505 to the power load portion 509. The signal processing circuit 504 also controls operation of the power receiving device antenna circuit 503. That is, the signal processing circuit 504 can control the intensity, the frequency, or the like of a signal transmitted from the power receiving device antenna circuit 503.

The power load portion 509 is a driver portion which receives electric power from the secondary battery 505 and drives the power receiving device 501. Typical examples of the power load portion 509 include a motor and a driver circuit; any other device which drives the power receiving device by electric power received can be used as the power load portion 509 as appropriate. The power feeding device antenna circuit 512 transmits signals to the power receiving device antenna circuit 503 or receives signals from the power receiving device antenna circuit 503.

The signal processing circuit 513 processes signals received by the power feeding device antenna circuit 512. The signal processing circuit 513 also controls operation of the power feeding device antenna circuit 512. That is, the signal processing circuit 513 can control the intensity, the frequency, or the like of a signal transmitted from the power feeding device antenna circuit 512.

The secondary battery according to one embodiment of the present invention is used as the secondary battery 505 included in the power receiving device 501 in the RF power feeding system shown in FIG. 9. With the use of the secondary battery according to one embodiment of the present invention in the RF power feeding system, the amount of power storage can be increased as compared with a conventional secondary battery. Accordingly, the time interval of the wireless power feeding can be increased (the frequency of power feeding can be reduced).

In addition, the use of the secondary battery according to one embodiment of the present invention in the RF power feeding system enables the power receiving device 501 to be smaller and more lightweight on the basis of the conventional amount of power storage with which the power load portion 509 can be driven. Accordingly, the total cost can be reduced.

The power receiving device 501 includes the power receiving device portion 502 and the power load portion 509. The power receiving device portion 502 includes at least the power receiving device antenna circuit 503, the signal processing circuit 504, the secondary battery 505, a rectifier circuit 506, a modulation circuit 507, and a power supply circuit 508. In addition, the power feeding device 511 includes at least the power feeding device antenna circuit 512, the signal processing circuit 513, a rectifier circuit 514, a modulation circuit 515, a demodulation circuit 516, and an oscillator circuit 517.

The power receiving device antenna circuit 503 receives signals transmitted by the power feeding device antenna circuit 512 or transmits signals to the power feeding device antenna circuit 512. In the case where the power receiving device antenna circuit 503 receives a signal transmitted from the power feeding device antenna circuit 512, the rectifier circuit 506 generates a DC voltage from the signal received by the power receiving device antenna circuit 503.

The signal processing circuit 504 processes signals received by the power receiving device antenna circuit 503 and controls charge of the secondary battery 505 and supply of electric power from the secondary battery 505 to the power supply circuit 508. The power supply circuit 508 converts a voltage stored in the secondary battery 505 into a voltage requisite for the power load portion 509. The modulation circuit 507 is used to transmit a response signal from the power receiving device 501 to the power feeding device 511.

With the power supply circuit 508, electric power supplied to the power load portion 509 can be controlled. Thus, overvoltage application to the power load portion 509 can be suppressed, reducing deterioration or breakdown of the power receiving device 501.

In addition, with the modulation circuit 507, a signal can be transmitted from the power receiving device 501 to the power feeding device 511. Therefore, upon judgment of the amount of charged power in the power receiving device 501 as being a certain amount of power, a signal can be transmitted from the power receiving device 501 to the power feeding device 511 so that power feeding from the power feeding device 511 to the power receiving device 501 can be stopped. As a result, the secondary battery 505 is not fully charged, which enables the number of times the secondary battery 505 is charged to be increased.

The power feeding device antenna circuit 512 transmits signals to the power receiving device antenna circuit 503 or receives signals from the power receiving device antenna circuit 503. When a signal is to be transmitted to the power receiving device antenna circuit 503, the signal processing circuit 513 generates a signal to be transmitted to the power receiving device. The oscillator circuit 517 generates a signal with a constant frequency. The modulation circuit 515 applies a voltage to the power feeding device antenna circuit 512 depending on the signal generated by the signal processing circuit 513 and the signal with the constant frequency generated by the oscillator circuit 517.

Thus, a signal is output from the power feeding device antenna circuit 512. On the other hand, when a signal is to be received from the power receiving device antenna circuit 503, the rectifier circuit 514 rectifies the received signal. From signals rectified by the rectifier circuit 514, the demodulation circuit 516 extracts a signal transmitted from the power receiving device 501 to the power feeding device 511. The signal processing circuit 513 analyzes the signal extracted by the demodulation circuit 516.

Any circuit may be provided between circuits as long as the RF power feeding can be performed. For example, after the power receiving device 501 receives a signal and the rectifier circuit 506 generates a DC voltage, a circuit such as a DC-DC converter or a regulator that is provided in a subsequent stage may generate a constant voltage. Thus, overvoltage application to the inside of the power receiving device 501 can be suppressed.

Note that when the secondary battery according to one embodiment of the present invention is used in the RF power feeding system and the power receiving device antenna circuit 503 and the secondary battery 505 are overlapped with each other, it is preferable that the impedance of the power receiving device antenna circuit 503 is not changed by deformation of the secondary battery 505 due to charge and discharge of the secondary battery 505 and according deformation of an antenna. If the impedance of the antenna is changed, in some cases, electric power is not supplied sufficiently.

For example, the secondary battery 505 may be placed in a battery pack formed of metal or ceramics. In that case, the power receiving device antenna circuit 503 and the battery pack are preferably separated from each other by several tens of micrometers or more.

The charging signal has no limitation on its frequency and may have any band of frequency as long as electric power can be transmitted. For example, the signal for charging may have any of an LF band at 135 kHz (long wave), an HF band at 13.56 MHz, a UHF band at 900 MHz to 1 GHz, and a microwave band at 2.45 GHz.

A signal transmission method may be properly selected from various methods including an electromagnetic coupling method, an electromagnetic induction method, a resonance method, and a microwave method. In order to prevent energy loss due to foreign substances containing moisture, such as rain and mud, the electromagnetic induction method or the resonance method using a low frequency band, specifically, very-low frequencies of 3 kHz to 30 kHz, low frequencies of 30 kHz to 300 kHz, medium frequencies of 300 kHz to 3 MHz, or high frequencies of 3 MHz to 30 MHz is preferably used.

This embodiment can be implemented in combination with any other embodiment.

This application is based on Japanese Patent Application serial no. 2011-160695, 2011-160697, and 2011-160696 each filed with Japan Patent Office on Jul. 22, 2011, the entire contents of which are hereby incorporated by reference.

The invention claimed is:

1. A method for manufacturing graphite oxide, comprising:
    adding graphite to a solution with an oxidizer to oxidize the graphite so that a dispersion solution containing graphite oxide is formed;
    adding a pH adjuster to the dispersion solution so that pH of the dispersion solution becomes 6 to 8;
    performing a first electrodialysis to remove cations and anions from the dispersion solution; and
    performing a second electrodialysis to remove cations from the dispersion solution,
    wherein a bipolar membrane is used in the second electrodialysis.

2. The method for manufacturing graphite oxide, according to claim 1, wherein the pH adjuster is lithium hydroxide or ammonium hydroxide.

3. The method for manufacturing graphite oxide, according to claim 1,
    wherein a first cation exchange membrane and an anion exchange membrane are used in the first electrodialysis, and
    wherein a second cation exchange membrane and the bipolar membrane are used in the second electrodialysis.

4. A method for manufacturing graphene oxide, comprising:
    adding graphite to a solution with an oxidizer to oxidize the graphite so that a dispersion solution containing graphite oxide is formed;
    adding a pH adjuster to the dispersion solution so that pH of the dispersion solution becomes 6 to 8;
    performing a first electrodialysis to remove cations and anions from the dispersion solution;
    performing a second electrodialysis to remove cations from the dispersion solution; and
    performing an ultrasonic treatment on graphite oxide obtained by the first electrodialysis and the second electrodialysis so that graphene oxide is formed,
    wherein a bipolar membrane is used in the second electrodialysis.

5. A method for manufacturing graphene, comprising reducing graphene oxide obtained by the method according to claim 4.

6. The method for manufacturing graphene oxide, according to claim 4, wherein the pH adjuster is lithium hydroxide or ammonium hydroxide.

7. The method for manufacturing graphene oxide, according to claim 4,
    wherein a first cation exchange membrane and an anion exchange membrane are used in the first electrodialysis, and
    wherein a second cation exchange membrane and the bipolar membrane are used in the second electrodialysis.

8. The method for manufacturing graphite oxide, according to claim 1, wherein the oxidizer comprises potassium permanganate.

9. The method for manufacturing graphene oxide, according to claim 4, wherein the oxidizer comprises potassium permanganate.

* * * * *